(12) United States Patent
Suzuki

(10) Patent No.: US 11,270,724 B1
(45) Date of Patent: Mar. 8, 2022

(54) GLASS SUBSTRATES FOR HEAT ASSISTED MAGNETIC RECORDING (HAMR) AND METHODS AND APPARATUS FOR USE WITH THE GLASS SUBSTRATES

(71) Applicant: Western Digital Technologies, Inc., San Jose, CA (US)

(72) Inventor: Shoji Suzuki, San Jose, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/321,032

(22) Filed: May 14, 2021

Related U.S. Application Data

(60) Provisional application No. 63/156,830, filed on Mar. 4, 2021.

(51) Int. Cl.
*G11B 5/73* (2006.01)
*G11B 5/40* (2006.01)
(Continued)

(52) U.S. Cl.
CPC ............... *G11B 5/40* (2013.01); *G11B 5/7366* (2019.05); *G11B 5/73921* (2019.05); *G11B 27/36* (2013.01); *G11B 2005/0021* (2013.01)

(58) Field of Classification Search
None
See application file for complete search history.

(56) References Cited

U.S. PATENT DOCUMENTS

| 7,531,485 | B2 | 5/2009 | Hara et al. |
| 8,652,660 | B2 | 2/2014 | Isono et al. |
| | | (Continued) | |

FOREIGN PATENT DOCUMENTS

| JP | 2011246290 A | 12/2011 |
| JP | 2011253575 A | 12/2011 |
| WO | 2020/231693 A1 | 11/2020 |

OTHER PUBLICATIONS

Eda et al., "Thinner Glass Substrate designed for 10 platters 3.5 inch HDD and HAMR application"; Hoya Memory Disk Technologies Ltd, published Aug. 2018; http://tmrc2018.ucsd.edu/Archive/P2-9.pdf; 2 pages.

*Primary Examiner* — Tan X Dinh
(74) *Attorney, Agent, or Firm* — Loza & Loza, LLP; Gabriel Fitch

(57) ABSTRACT

Techniques for determining a maximum permissible media deposition temperature for depositing one or more layers over a substrate of a heat assisted magnetic recording (HAMR) platform. In one aspect, a method includes controlling a thermomechanical analyzer to measure the mechanical expansion of a glass material versus temperature within a temperature range that is below the primary transformation temperature (Tg) of the glass material to detect a possible initial transformation that occurs within the glass material at a temperature (Tt) below the primary transformation temperature (Tg). If such an initial transformation is detected, the maximum deposition temperature is set based on the initial transformation temperature (Tt), rather than on the primary transformation temperature (Tg). Otherwise, the maximum permissible media deposition temperature is set based on the transformation temperature (Tg). In other aspects, methods for characterizing a glass material for suitability within the substrate of the HAMR platform are provided.

23 Claims, 13 Drawing Sheets

(51) Int. Cl.
*G11B 27/36* (2006.01)
*G11B 5/00* (2006.01)

(56) References Cited

U.S. PATENT DOCUMENTS

| | | | |
|---|---|---|---|
| 8,795,859 B2* | 8/2014 | Fukumoto | G11B 5/82 428/846.9 |
| 8,824,248 B2* | 9/2014 | Matsumoto | G11B 13/04 369/13.24 |
| 8,901,019 B2* | 12/2014 | Annamalai | C03C 3/06 501/54 |
| 9,242,888 B2* | 1/2016 | Isono | C03B 11/122 |
| 9,296,638 B2 | 3/2016 | Lezzi et al. | |
| 9,595,284 B2* | 3/2017 | Tamaki | G11B 5/8404 |
| 9,728,217 B2* | 8/2017 | Yoshida | G11B 5/84 |
| 10,720,180 B2* | 7/2020 | Azuma | G11B 5/8404 |
| 2009/0239102 A1 | 9/2009 | Nagashima et al. | |
| 2014/0050912 A1* | 2/2014 | Isono | G11B 5/73921 428/220 |
| 2018/0174606 A1 | 6/2018 | Azuma | |
| 2021/0024403 A1 | 1/2021 | Tokunaga et al. | |
| 2021/0061699 A1* | 3/2021 | Azuma | C03C 3/083 |
| 2021/0090601 A1* | 3/2021 | Suzuki | G11B 5/73921 |
| 2021/0230042 A1* | 7/2021 | Azuma | C03B 33/0222 |

* cited by examiner

GLASS SUBSTRATES FOR HEAT ASSISTED MAGNETIC RECORDING (HAMR) AND METHODS AND APPARATUS FOR USE WITH THE GLASS SUBSTRATES

CLAIM OF PRIORITY UNDER 35 U.S.C. § 119

The present Application for Patent claims priority to Provisional Application No. 63/156,830, entitled "GLASS SUBSTRATES FOR USE WITH HEAT ASSISTED MAGNETIC RECORDING (HAMR) AND METHODS FOR CHARACTERIZING THE GLASS SUBSTRATES," filed Mar. 4, 2021, which is assigned to the assignee hereof and hereby expressly incorporated by reference herein.

FIELD

The present disclosure relates to magnetic recording media, and more particularly to magnetic recording media for use with heat assisted magnetic recording (HAMR) wherein the magnetic recording media have glass-based substrates and further relates to methods and apparatus for use with such substrates.

INTRODUCTION

Magnetic storage devices such as hard drive disks (HDDs) are storage devices that store data or information magnetically. Heat assisted magnetic recording (HAMR) techniques can potentially increase the areal density of information recorded magnetically, while avoiding data erasure caused by thermal fluctuations, by using high-coercivity media materials. The media materials may be deposited at high temperatures upon a glass-based disk substrate along with various other layers or materials. The high deposition temperatures can cause the disk substrate to expand and deform during the deposition of the various layers or materials.

SUMMARY

A method for determining a permissible media deposition temperature for use in depositing a layer over a substrate of glass material is provided. The method includes: controlling a measurement device to measure mechanical expansion of the glass material versus temperature; determining a transformation temperature for the glass material from the measure of the mechanical expansion of the glass material versus temperature; determining a slope of the mechanical expansion of the glass material versus temperature within a temperature range below the transformation temperature; detecting a change in the slope within the temperature range; determining whether the change in the slope exceeds a threshold; and generating an indication, in response to a determination that the change in the slope exceeds the threshold, that a permissible media deposition temperature for use with the glass material is below the temperature at which the change in the slope exceeds the threshold. In some aspects, the method further includes generating an indication, in response to a determination that the change in the slope does not exceed the threshold within the temperature range, that a maximum permissible media deposition temperature for use with the glass material is the transformation temperature.

A method for characterizing a glass material for suitability in a substrate for a magnetic recording platform is provided. The method includes: controlling a measurement device to measure mechanical expansion of the glass material versus temperature over a temperature range that extends up to a media deposition temperature; determining a slope of the mechanical expansion of the glass material versus temperature within the temperature range; detecting a change in the slope within the temperature range; determining whether the change in the slope exceeds a threshold; and generating an indication, in response to a determination that the change in the slope exceeds the threshold, that the glass material is not suitable for use in the substrate for the magnetic recording platform if the substrate is exposed to the media deposition temperature. In some aspects, the method further includes generating an indication, in response to a determination that the change in the slope does not exceed the threshold within the temperature range, that the glass material is suitable for use in the substrate for the magnetic recording platform even if exposed to the media deposition temperature, such as temperatures for use with heat assisted magnetic recording (HAMR).

An apparatus for determining a permissible media deposition temperature for use in depositing a layer over a substrate of glass material is provided. The apparatus includes: a measurement device configured to measure mechanical expansion of the glass material versus temperature; and a processor. The processor is configured to: control the measurement device to measure mechanical expansion of the glass material versus temperature; determine a transformation temperature for the glass material from the measure of the mechanical expansion of the glass material versus temperature; determine a slope of the mechanical expansion of the glass material versus temperature within a temperature range below the transformation temperature; detect a change in the slope within the temperature range; determine whether the change in the slope exceeds a threshold; and generate an indication, in response to a determination that the change in the slope exceeds the threshold, that a permissible media deposition temperature for use with the glass material is below the temperature at which the change in the slope exceeds the threshold. In some aspects, the processor is further configured to generate an indication, in response to a determination that the change in the slope does not exceed the threshold within the temperature range, that a maximum permissible media deposition temperature for use with the glass material is the transformation temperature.

An apparatus for use in characterizing a glass material for suitability in a substrate for a magnetic recording platform is provided. The apparatus includes: a measurement device configured to measure mechanical expansion of the glass material versus temperature; and a processor. The processor is configured to: control the measurement device to measure the mechanical expansion of the glass material versus temperature over a temperature range that extends up to a media deposition temperature; determine a slope of the mechanical expansion of the glass material versus temperature within the temperature range; detect a change in the slope within the temperature range; determine whether the change in the slope exceeds a threshold; and generate an indication, in response to a determination that the change in the slope exceeds the threshold, that the glass material is not suitable for use in the substrate for the magnetic recording platform if the substrate is exposed to the media deposition temperature. In some aspects, the processor is further configured to generate an indication, in response to a determination that the change in the slope does not exceed the threshold within the temperature range, that the glass material is suitable for use in the substrate for the magnetic recording platform even if when exposed to the media deposition temperature, such as media deposition temperatures for use with HAMR.

A glass-based media substrate disk is provided that includes a glass material having the characteristics: a plot of mechanical expansion of the glass material versus temperature does not exhibit a change in slope greater than a threshold within a range of temperatures below a media deposition temperature; and wherein the slope exceeding the threshold is indicative of unsuitability in a flatness characteristic of the substrate following deposition of media onto the substrate disk at the media deposition temperature.

A magnetic recording medium is provided that includes a glass-based substrate with a flatness metric of less than twenty-five microns; and one or more magnetic recording layers deposited on the glass substrate at a deposition temperature at or above 700° C.; wherein the glass-based substrate includes a glass material that is characterized by a variation in mechanical expansion versus temperature not exceeding a 20% slope threshold anywhere below a deposition temperature.

DETAILED DESCRIPTION

Figure 1:
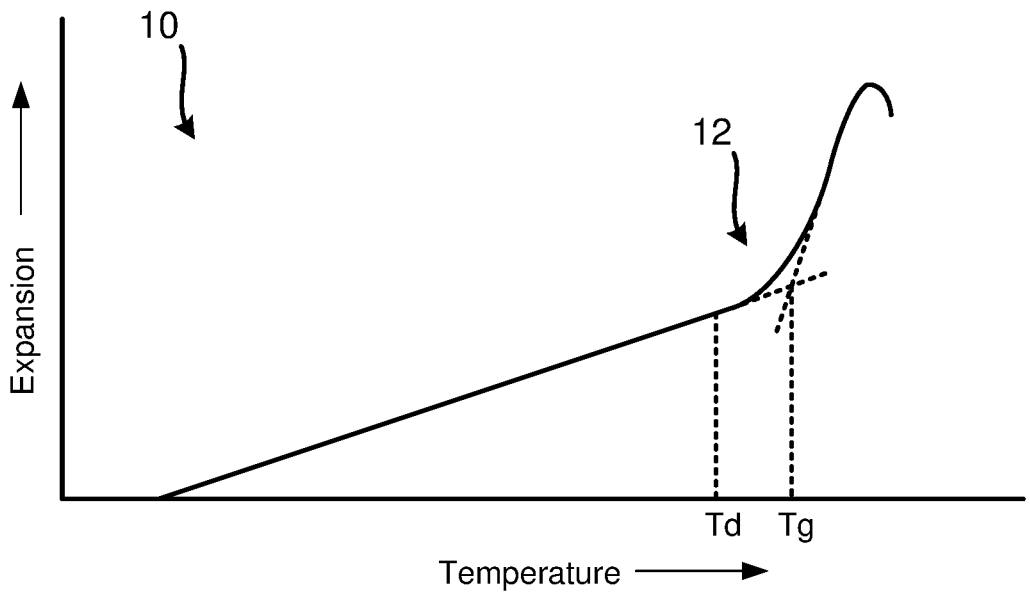
FIG. 1 illustrates a mechanical expansion versus temperature plot or curve in accordance with the prior art that illustrates a material transformation associated with a primary transformation temperature (Tg).

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Overview

Heat assisted magnetic recording (HAMR) is a magnetic storage technology for use in storage devices such as hard disk drives wherein storage material is temporarily heated during the writing of data, potentially allowing for significant increases in areal density of data as compared to other magnetic storage technologies, such as traditional perpendicular magnetic recording (PMR), helium-filled drives or shingled magnetic recording (SMR). The magnetic storage disk used for HAMR (a single disk is discussed here, though hard disk drives often have multiple such disks) may have a glass-based substrate upon which various magnetic recording layers and other layers are deposited. If the deposition temperature, which may depend on the substrate glass material, approaches a glass transition temperature, the viscosity of the glass may decrease exponentially. The softening can lead to deformation of bulk material as flatness deviations or "creep." The deformation often gives a concave or convex shape to the substrate. The deviation from the flat surfaces can cause variations to magnetic read signals applied to (or obtained from) the disk, especially to a servo track signal. This can reduce the track density capability and consequently lower capacity. In addition, the outer diameter (OD) edges of such deformed disks are closer to a load/unload ramp in the hard disk drive and can also reduce the shock performance.

Accordingly, it is desirable in at least some examples that a top surface of the substrate be sufficiently flat so the layers deposited thereon can be well-suited to reliable high density data storage. Note that flatness is not necessarily a localized geometrical feature of a disk. The entire disk may have a concave, convex, saddle, or cylindrical shape. Such macroscopic variations can give an undesirable flying trajectory to a magnetic head/slider, especially after clamping. A clearance between the OD edge of a disk and the load/unload ramp may also be compromised and thus reduce the tolerance to the shock events, where the OD edge moves due to the vibration and hits the ramp material. If this happens during device operation, the disk edge can generate wear debris and such can trigger a head crash and/or signal erasures.

In some aspects, a flatness metric can be determined for the substrate that quantifies the aforementioned flatness deviations. In some examples, it is desirable that the glass-based substrate have a flatness metric that is low and, for example, below a flatness metric threshold of 30 μm. However, HAMR employs high temperatures during deposition of 700° C. or above. At such high temperatures, glass-based substrate materials may transform and deform and, as a result of the transformation, the flatness of the substrate may be significantly degraded, causing a corresponding degradation in properties of the resulting media disk, such as the aforementioned mechanical problems (e.g., head flyability and shock performance).

The temperature at which the glass-based substrate undergoes a substantial transformation with increasing temperature is defined herein as a transformation temperature (Tg). The transformation temperature (Tg) as the term is used herein thus signifies a substantial change in the expansion rate, which often occurs between a strain point temperature (viscosity=$10^{14.5}$ poise) and an annealing point temperature (viscosity=$10^{13}$ poise), where poise is a centimeter-gram-second unit of dynamic viscosity equal to one dyne-second per square centimeter. Note that in the literature, "Tg" is often used to specifically represent a "glass transition temperature," which is not necessarily the same as the term Tg as used herein. Note also that the glass material that is often used in state-of-the-art substrates for HAMR is so-called amorphous glass. In contrast with crystalized glass, amorphous glass exhibits a "super-cooled melt" condition and a "quasi-solid melt" condition. Herein, at least some aspects of the disclosure are applicable to either amorphous glass or crystalline glass.

The Tg for a particular glass-based material may be determined based upon a thermal expansion curve 10 such as the one shown in FIG. 1 for an illustrative material. Within FIG. 1, the horizontal axis represents a change in temperature of the material and the vertical axis represents expansion of the material. As shown in the figure, the illustrative material exhibits a substantially constant rate of expansion with increasing temperature until it nears a transformation 12 near Tg and then the rate of expansion increases substantially. In some examples, the value of Tg may be quantified by calculating the slope of the curve 10 below the transformation 12 and the slope of the curve 10 above the transformation (with the respective slopes shown in dashed lines in the figure) and then determining the intersection point of the slopes, wherein the temperature at that intersection point is Tg. (Although FIG. 1 shows expansion and temperature in arbitrary units, expansion may be quantified, e.g., in microns (μm) and temperature may be quantified, e.g., in degrees Celsius.)

FIG. 1 also illustrates a media deposition temperature Td that is set below Tg within a temperature realm wherein the expansion is substantially uniform. However, if the deposition temperature Td instead exceeded Tg, the glass-based substrate would likely deform during the deposition process, resulting in degradation in the flatness of the top surface of the substrate (and a corresponding degradation in mechanical properties and other properties of the magnetic recording platform). Accordingly, the glass-based material may need to be abandoned as a candidate for the substrate and replaced with a different glass base-material (if available) that has a suitably high Tg. In some cases, it may be possible to reduce the media deposition temperature to a temperature sufficiently below Tg to avoid the problem. A maximum permissible media deposition temperature thus may be determined for use with a particular glass-based material. For example, the maximum permissible media deposition temperature might be set 50° C. below Tg. However, as a practical matter, the media deposition temperature may need to be set higher to achieve desired recording properties of the magnetic media and hence cannot be lowered without diminishing the areal density of data.

The inventor of the present disclosure has noted that, for at least some glass-based materials, an additional smaller transformation can occur within the material at a temperature below Tg. This is illustrated within the thermal expansion curve 20 of FIG. 2 in which a first small transformation 22 occurs in the mechanical expansion versus temperature curve 20 at a temperature Tt that is below the larger transformation 12 that corresponds to Tg. (The larger transformation 12 is referred to herein as a primary transformation to distinguish it from the smaller first transformation 22.) The first transformation 22, although relatively small in magnitude compared to the primary transformation 12, can nevertheless cause a change in the material that is significant enough to degrade the flatness of the resulting substrate and, in turn, degrade the mechanical properties of the resulting magnetic recording disk (e.g., head flyability and shock performance), and potentially result in a lower areal density of data than desired or expected. Note that at temperatures below the first transformation 22, the slope 24 of the mechanical expansion versus temperature curve 20 is substantially constant.

Herein, in some aspects, methods and apparatus are described for detecting whether or not such a first (smaller) transformation occurs within a particular glass-based material at a temperature below Tg. If a first transformation is detected below Tg, then the glass-based material may need to be abandoned as a candidate for the substrate (e.g., possibly unusable for HAMR media) and replaced with a different glass-based material (if available) that does not exhibit such a first transformation below Tg.

Alternatively, in some cases, it may be possible to reduce the media deposition temperature to somewhere below the temperature of the first transformation. Accordingly, in some aspects, methods and apparatus are described herein for identifying a maximum permissible media deposition temperature based on the temperature of the first transformation for use with materials where such a first transformation occurs.

Still further, in some aspects, a glass-based media substrate disk is provided that has a glass material characterized, in part, by its suitability or unsuitability in a flatness characteristic of the substrate following deposition of media onto the substrate disk at a media deposition temperature, particularly a glass-based media substrate disk for use with HAMR. In some aspects, a magnetic recording platform is provided that is characterized, in part, by whether a variation in mechanical expansion versus temperature of a glass-based substrate of the structure exceeds a particular slope threshold below a media deposition temperature.

Insofar as suitability is concerned, suitability has at least two aspects, one pertaining to crystal orientation and grain segregation of sputtered materials and another pertaining to mechanical suitability, such as the stability for flying heads. Herein, aspects of the disclosure are directed in large part to assessing suitability in terms of mechanical suitability but at least some aspects may apply to suitability in terms of crystal orientation and grain segregation of sputtered materials for magnetic recording or for other purposes. Moreover, although the illustrative examples provided herein primarily refer to achieving satisfactory flatness in substrates for magnetic recording media, aspects of the disclosure are applicable to substrates or other flat structures or layers used for other purposes. That is, at least some of the methods and apparatus described herein are applicable to achieving, assessing, or characterizing high precision flatness within structures, layers or materials used for other purposes besides magnetic recording, such as, for example, mirrors or other reflective surfaces or flat panels. In some aspects, the disclosure provides a more accurate method to ensure flat glass substrates.

Exemplary Data Storage Device

Before discussing methods, apparatus, and materials that exploit the recognition of the aforementioned first transformation within some glass-based substrates, an exemplary disk drive is described in which media having such a glass-based substrate may be used.

Figure 3:
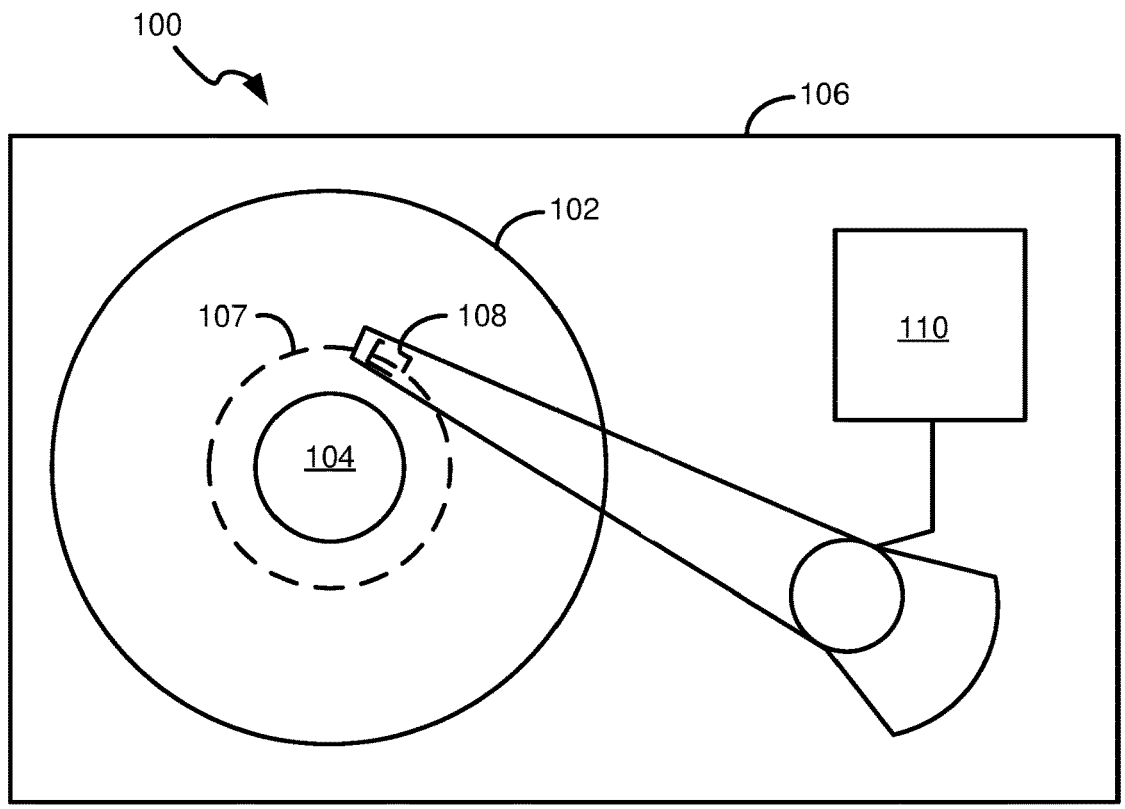
FIG. 3 is a plan diagram schematically illustrating a data storage device including a slider and a magnetic recording medium in accordance with one aspect of the disclosure.

FIG. 3 is a top schematic view (plan view) of a data storage device 100 (e.g., disk drive or magnetic recording device) configured for HAMR including a slider 108 and a magnetic recording medium 102 having a glass-based substrate (not visible in FIG. 3, but see FIGS. 11-13, discussed below) selected, configured or characterized according to one or more aspects of the disclosure described in detail below. The laser (not visible in FIG. 3 but see 114 in FIG. 4) is positioned with a head/slider 108. Disk drive 100 may include one or more disks/media 102 to store data. Disk/media 102 resides on a spindle assembly 104 that is mounted to a drive housing. Data may be stored along tracks in the magnetic recording layer of disk 102. The reading and writing of data are accomplished with the head 108 (slider) that may have both read and write elements (108a and 108b of FIG. 4). The write element 108a is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller).

Figure 4:
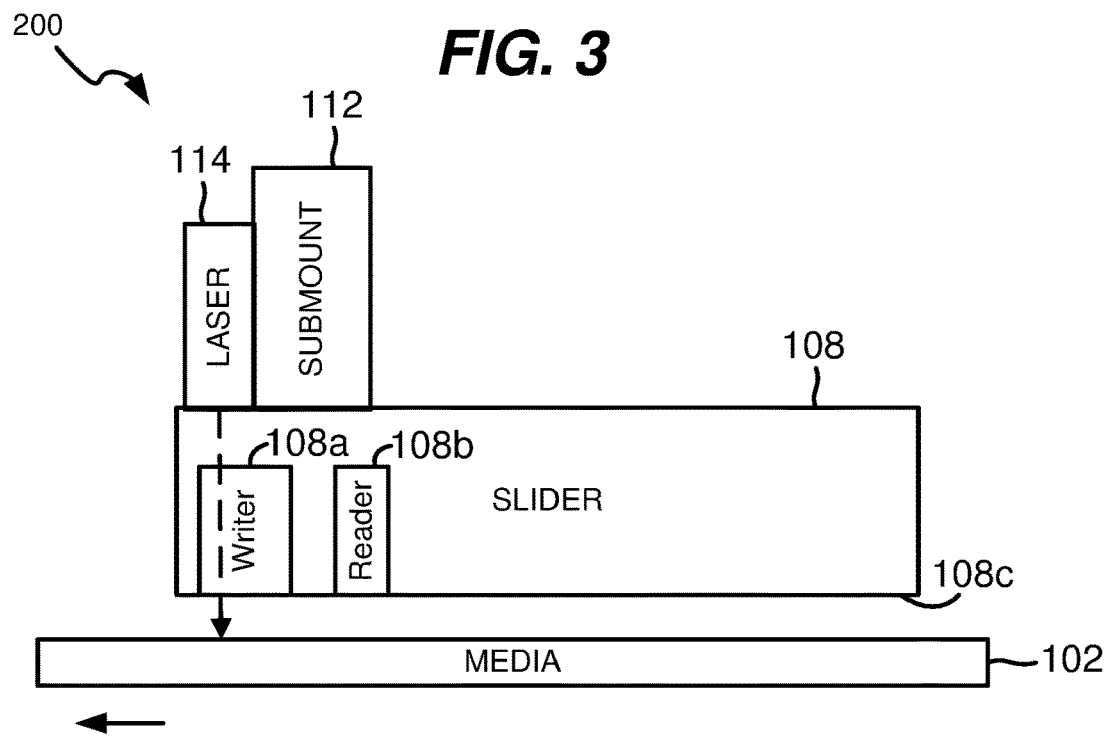
FIG. 4 is a side schematic (profile) view of the slider and magnetic recording medium of FIG. 3 in accordance with one aspect of the disclosure.

FIG. 4 is a side schematic view (profile view) 200 of the slider 108 and magnetic recording medium 102 of FIG. 3. The magnetic recording medium 102 includes a glass-based substrate (not visible in FIG. 4, but see FIGS. 11-13, discussed below) configured or characterized according to one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108a and a read element (e.g., reader) 108b positioned along an air bearing surface (ABS) 108c of the slider for writing information to, and reading information from, respectively, the media 102.

In operation, the laser 114 is configured to generate and direct light energy to a waveguide (e.g., along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 within or near the write element 108a, and near the read element 108b. The anticipated recording temperature is in the range of about 350° C. to 400° C. In the aspect illustrated in FIG. 4, the laser directed light is disposed within the writer 108a and near a trailing edge of the slider. In other aspects, the laser directed light may instead be positioned between the writer 108a and the reader 108b. FIGS. 3 and 4 illustrate a specific example of a HAMR system. In other examples, the magnetic recording medium 102 with the glass-based substrate according to aspects of the disclosure can be used in other suitable HAMR systems (e.g., with other sliders configured for HAMR) or for use with other magnetic recording technologies. Herein, many of the examples are HAMR examples, since HAMR may require high deposition temperatures, but at least some aspects of the present disclosure are not limited to HAMR, and other magnetic recording technologies may be employed, such as other types of energy assisted recording technology (e.g., a spin torque oscillator (STO) in a microwave assisted magnetic recording (MAMR) head) or non-energy assisted recording technology.

Exemplary Techniques for Characterizing a Glass-Based Material for HAMR Suitability Turning now to FIGS. 5-7, exemplary methods and apparatus will now be described for characterizing a glass-based material for suitability in a substrate for a magnetic recording platform for use with HAMR or other magnetic recording technologies.

Figure 5:
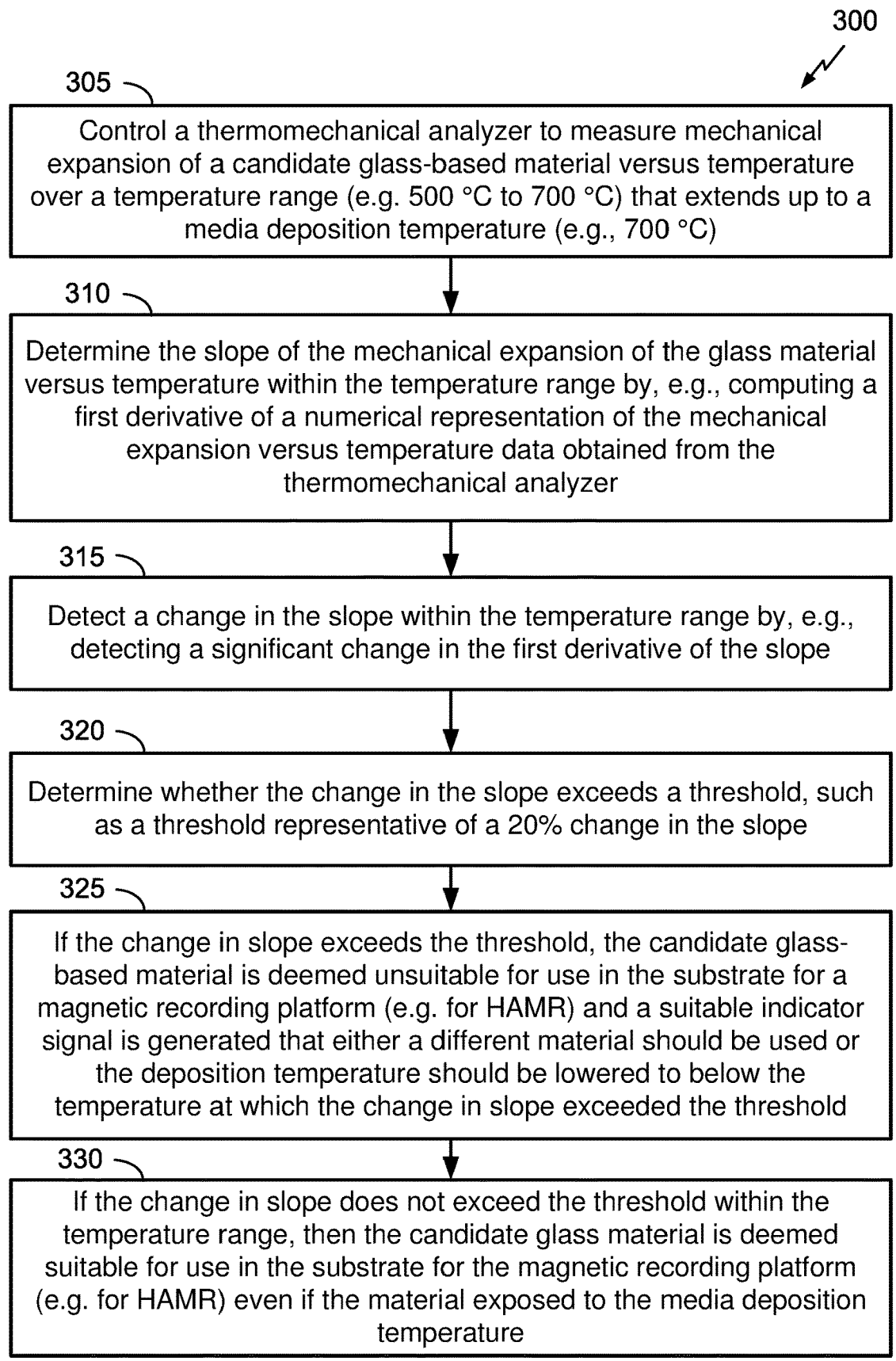
FIG. 5 illustrates an exemplary flow diagram of a method for characterizing a glass-based material for suitability in a substrate for a magnetic recording platform in accordance with an embodiment of the disclosure.

FIG. 5 illustrates a method 300 that may be performed by a computer processor, controller, or other suitable device for characterizing a glass-based material for suitability in a substrate for a magnetic recording platform. The computer processor may be, for example, a general purpose processor programmed with software or an application specific integrated circuit (ASIC) or other suitable hardware-, software-, or firmware-based device. At block, 305, the computer processor or other device controls a thermomechanical analyzer (or other suitable measurement device or apparatus) to measure the mechanical expansion of a candidate glass-based material versus temperature over a selected temperature range (e.g., 500° C. to 700° C.) that extends up to a media deposition temperature (e.g., 700° C.). The thermomechanical analyzer may perform a measurement technique in which a deformation of a sample under non-oscillating stress is monitored against temperature while the temperature of the sample, in a specified atmosphere, is adjusted over a range of values. Note that a significant factor in determining the rate or expansion is the time involved. Flatness deviation is regarded as "creep" of a viscoelastic material such as glass. Therefore, the longer the duration of time, the larger the deformation becomes, even under the same temperature. The thermomechanical analyzer may therefore have a feature to control the temperature as a function of time and commercially available testers often use 5° C./min for the measurements of expansion.

The candidate glass-based material may be initially selected, for example, by product design engineers who are seeking to identify glass-based materials that are suitable for use in a HAMR structure within a hard disk drive. The engineers may also input the expected media deposition temperature to be used later in the fabrication of the structure as well as the temperature range to be analyzed by the computer processor. The temperature 700° C. is just one example of a media deposition temperature, and 500° C. to 700° C. is just one example of a temperature range. In other examples, the temperature range is 20° C. to 700° C. In still other examples, the temperature range extends from 200° C. below the input media deposition temperature up to the input media deposition temperature. Other exemplary media deposition temperatures are in the range of 650° C. to 750° C. As can be appreciated these are just illustrative examples, which may be suited to HAMR. Lower media deposition temperatures may be appropriate for use with non-HAMR technologies.

Figure 2:
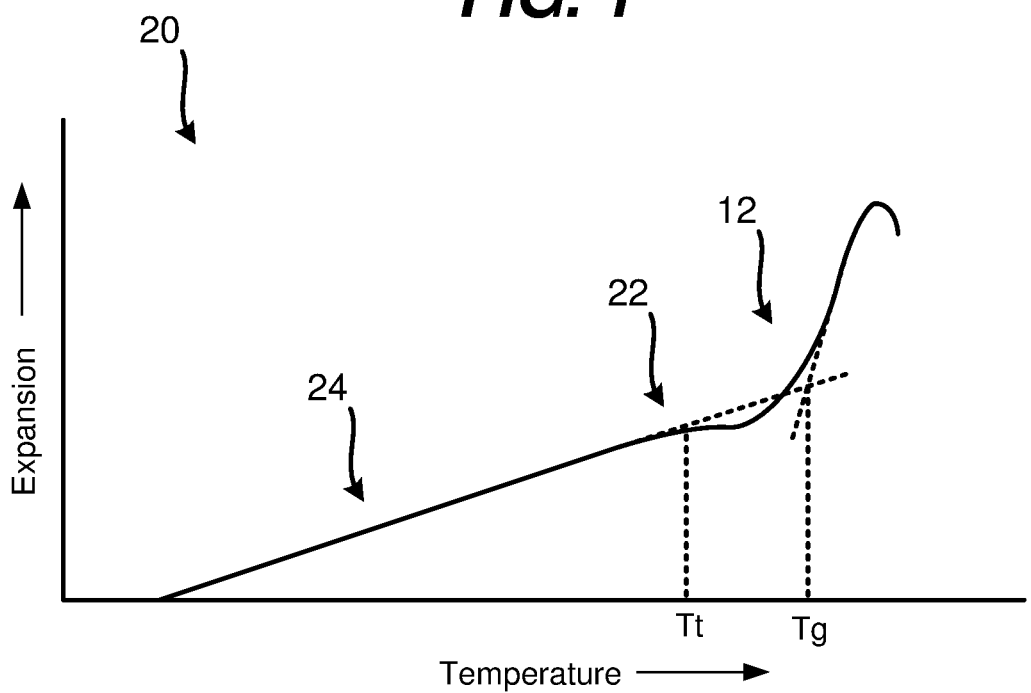
FIG. 2 illustrates a mechanical expansion versus temperature plot or curve that further illustrates an additional smaller transformation at a temperature below Tg in accordance with an embodiment of the disclosure.

At block, 310, the computer processor or other suitable device determines the slope of the mechanical expansion of the glass material versus temperature within the temperature range by, for example, computing a first derivative of a numerical representation of mechanical expansion versus temperature data obtained from the thermomechanical analyzer. Hence, in some examples, data generated by the thermomechanical analyzer is fed into the computer processor and stored within its memory for analysis as a numerical representation, such as a representation of the plot or curve 20 of FIG. 2. A program running within the computer processor (which may be embodied in software, hardware, and/or firmware) processes the data to compute, calculate or otherwise determine the first derivative of the numerical representation of mechanical expansion versus temperature data. This may be done by beginning at the lowest temperature within the selected range and proceeding to calculate the slope (i.e., first derivative) of the curve as the temperature increases. As shown in FIG. 2, the slope 24 may be substantially constant over an initial range of temperatures. In an illustrative example, the slope may be found to be 0.2 microns/degree ° C. (or 0.2 microns/degree ° K).

Figure 6:
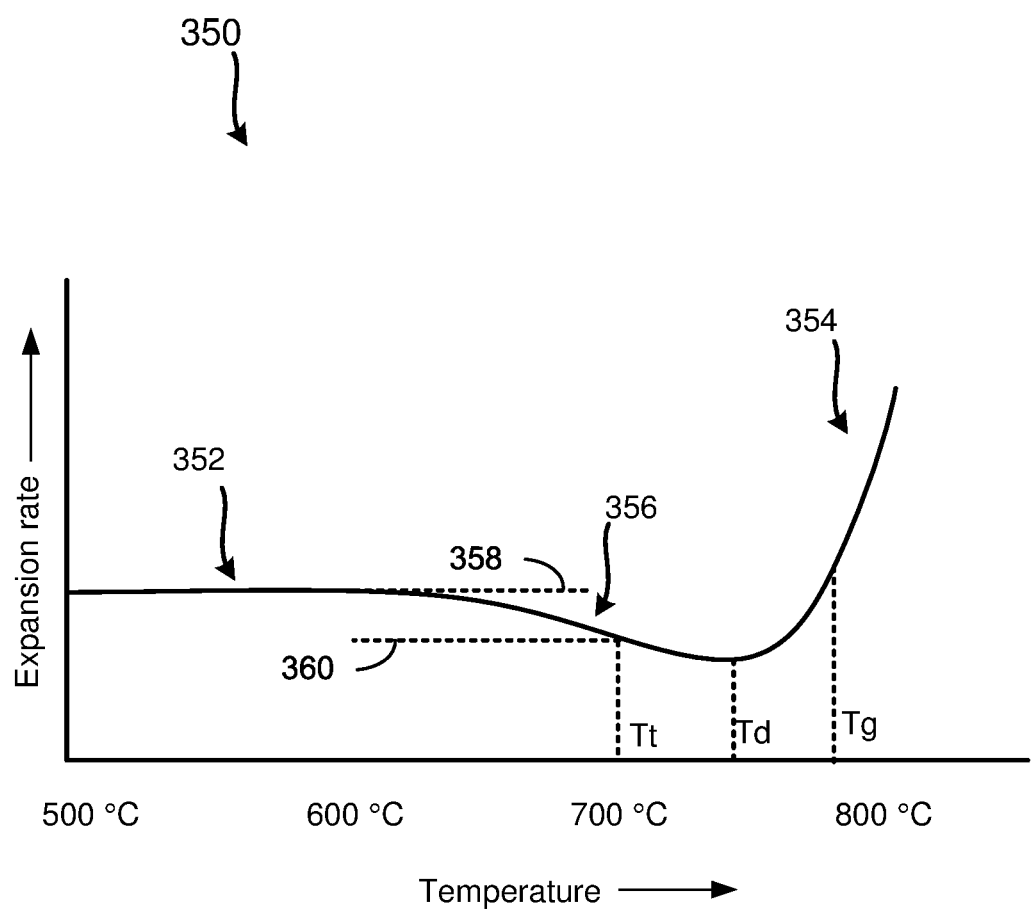
FIG. 6 illustrates a rate of mechanical expansion (slope) versus temperature plot or curve that further illustrates detection of a small transformation at a temperature below Tg in accordance with an embodiment of the disclosure.

FIG. 6 illustrates a first derivative curve or plot 350 for an exemplary glass-based material for a temperature range extending from 500 to 800° C. with the temperature increasing on the horizontal axis and with the expansion rate increasing on the vertical axis (wherein the expansion rate may be quantified, e.g., in $\mu m/° K$). Note that the curve 350 shown in FIG. 6 is a smoothed curve. In practical systems, the input data obtained from the thermomechanical analyzer may be noisy and so smoothing may appropriate to obtain smoothed slope data for further processing. In the example of FIG. 6, an initial portion 352 of curve 350 is substantially flat, indicating that the expansion of the material as a function of temperature within this temperature regime is mostly constant. The slope of a final portion 354 of curve 350 increases sharply, indicating that the expansion of the material as a function of temperature within this latter temperature regime accelerates rapidly, which is expected near Tg. (In the example of FIG. 6, Tg is at about 780° C., and the media deposition temperature Td is at about 750° C. and hence below Tg.)

Notably, in the example of FIG. 6, there is also a change in the expansion rate within a middle portion 356 of the curve 350 during which an increase in temperature causes a slowing of the expansion rate. That is, within portion 356, the slope of the expansion curve is no longer substantially constant (as it was within portion 352) and exhibits a downward deflection in expansion rate (slope), although the material has not yet reached the primary transformation associated with Tg and the temperature is below media deposition temperature Td. The transformation occurring within portion 356 is the aforementioned first (smaller) transformation that can occur below Tg within some glass-based materials.

Returning to FIG. 5, at block 315, the computer processor detects a change in the slope within the temperature range by, for example, detecting a significant change in the first derivative of the slope. That is, in some examples, the computer processor detects the change from the substantially constant portion 352 of curve 350 of FIG. 6 to the intermediate portion 356 of FIG. 6 wherein the slope is no longer substantially constant. At block 320 of FIG. 5, the computer processor then determines whether the change in the slope exceeds a threshold, such as a threshold representative of a 20% change in the slope. As shown in FIG. 6, the expansion rate (slope) during the substantially constant portion 352 is indicated by dashed line 358. The dashed line 360 represents a rate that is, e.g., 20% below rate 358. (Note that the expansion rate of FIG. 6 is shown in arbitrary units and so the drawing is not necessarily to scale.) The difference in rate between line 360 and line 358 thus represents the threshold difference that the computer processor uses at block 320 of FIG. 5 and Tt represents the temperature at which the change in slope exceeds the threshold. Note that a threshold set to represent a 20% change in expansion rate (slope) is just one example of a suitable threshold and the threshold value may be adjustable or programmable. In other examples, the threshold may be, for example, set in the range of 19% to 21% or, in other examples, set in the range of 18% to 22%, or in still other examples, set in the range of 15% to 25%.

At block 325 of FIG. 5, if the change in the slope exceeds the threshold, i.e., the material exhibits a significant transformation at a temperature below the media deposition temperature, the candidate glass material is thereby deemed unsuitable for use in the substrate for the magnetic recording platform (at least if the substrate is exposed to the media deposition temperature). The computer processor generates an indication or outputs a suitable signal to alert design engineers or others that the material is unsuitable. The signal indicates that either a different material should be used or the deposition temperature should be lowered to below the temperature at which the change in slope exceeded the threshold.

On the other hand, at block 330, if the change in slope does not exceed the threshold within the temperature range being analyzed, i.e., the material does not exhibit any significant transformations at temperatures below the media deposition temperature, the candidate glass material is deemed suitable for use in the substrate for the magnetic recording platform, even if the material exposed to the media deposition temperature. The computer processor generates an indication or outputs a suitable signal to that effect.

Notably, without detecting the first (smaller) transformation 356 that occurs below Tg and which is also below the planned media deposition temperature Td, the candidate material might be used within the substrate of a magnetic recording platform, resulting in the aforementioned degradation in flatness during deposition and the corresponding degradation in the properties of the resulting magnetic recording platform. Note also that to employ the method of FIG. 5, one need not know the reason why the first transformation occurs. That is, one need not know whether the first transformation occurs due to some initial small change from a solid-state or for some other reason. It is sufficient to detect whether the change in slope exceeds the specified threshold at a temperature below the media deposition temperature Td. If so, the material will likely exhibit the aforementioned degradation in flatness.

Figure 7:
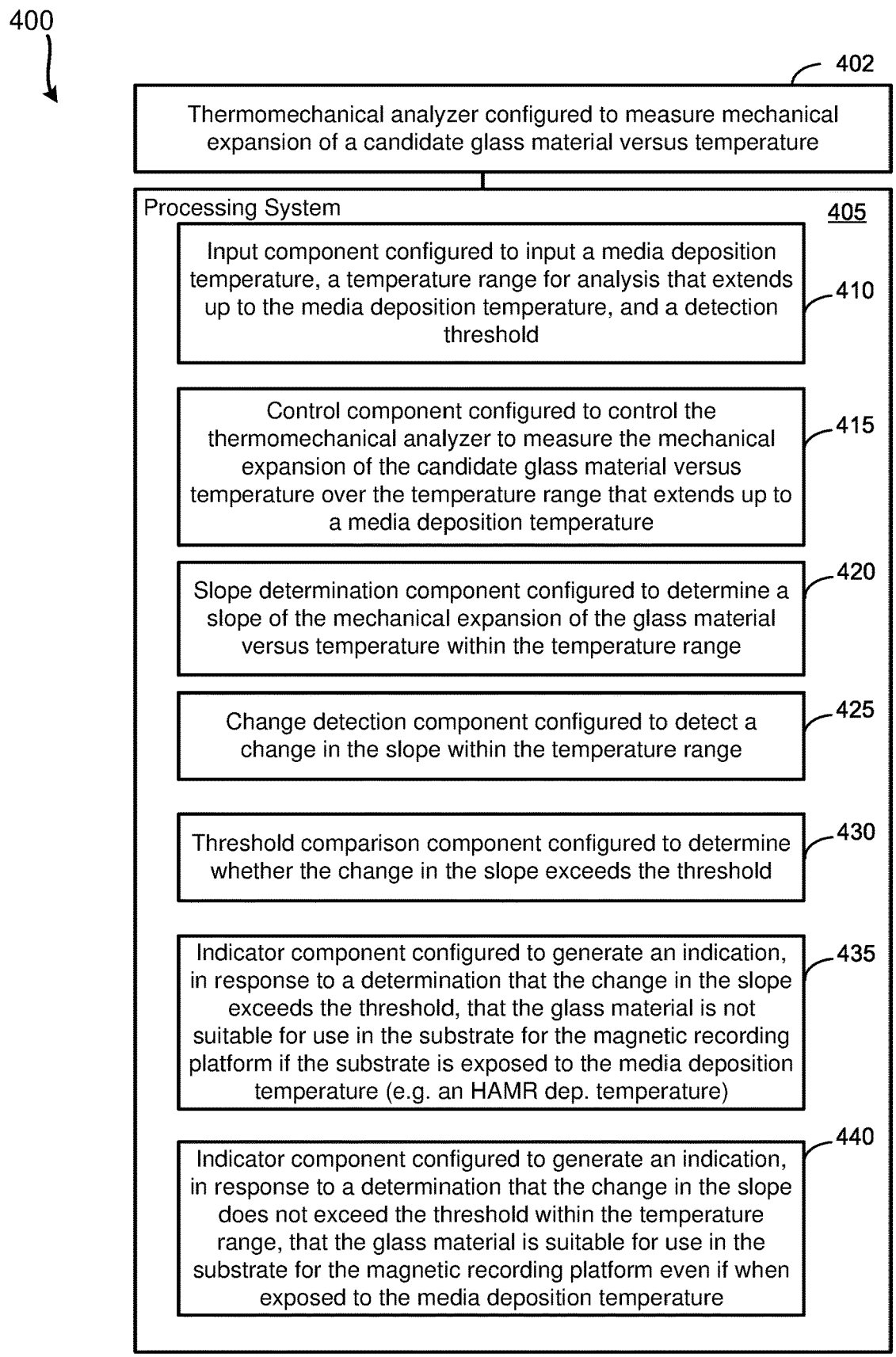
FIG. 7 illustrates an exemplary apparatus configured to characterize a glass-based material for suitability in a substrate for a magnetic recording platform in accordance with an embodiment of the disclosure.

FIG. 7 illustrates a system or apparatus 400 that may be used to implement the method of FIG. 5. The apparatus 400 includes a thermomechanical analyzer 402 configured to measure mechanical expansion of a candidate glass material versus temperature. The apparatus 400 also includes a processor or processing system 405 (e.g., a computer processor) configured to control the thermomechanical analyzer 402 and to analyze data obtained therefrom. The processing system 405 includes an input component 410 configured to input a media deposition temperature, which may be a HAMR deposition temperature (e.g., 700° C.), a temperature range for analysis that extends up to the media deposition temperature (e.g., 500° C. to 700° C.), and a detection threshold (e.g., 20%). The processing system 405 also includes a control component 415 configured to control the thermomechanical analyzer 402 to measure the mechanical expansion of the candidate glass material versus temperature over the temperature range that extends up to a media deposition temperature.

A slope determination component 420 is configured to determine a slope of the mechanical expansion of the glass material versus temperature within the temperature range based on data obtained from the thermomechanical analyzer 402. A change detection component 425 is configured to detect a change in the slope within the temperature range. A threshold comparison component 430 is configured to determine whether the change in the slope exceeds the threshold. A first indicator component 435 is configured to generate an indication (e.g., a first output signal), in response to a determination that the change in the slope exceeds the threshold, that the glass material is not suitable for use in the substrate for the magnetic recording platform if the substrate is exposed to the media deposition temperature (e.g., an HAMR deposition temperature). A second indicator component 440 is configured to generate an indication (e.g., a second output signal), in response to a determination that the change in the slope does not exceed the threshold within the temperature range, that the glass material is suitable for use in the substrate for the magnetic recording platform even if when exposed to the media deposition temperature. Note that in some examples, a single processor is configured to include each of the processing components shown in FIG. 7 (e.g., components 410, 415, 420, 425, 430, 435, and 440).

Exemplary Techniques for Setting a Maximum Permissible Deposition Temperature

Figure 8:
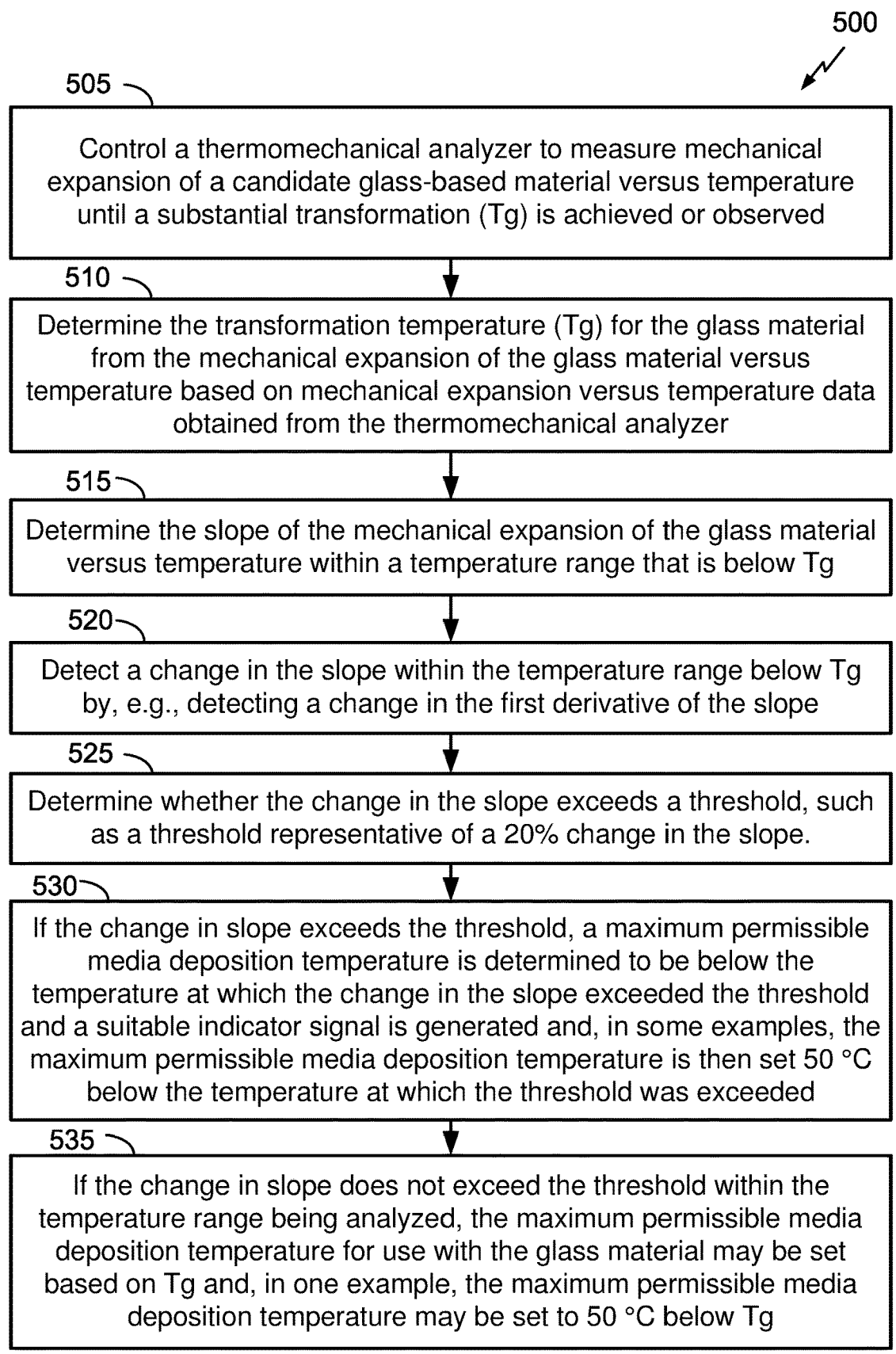
FIG. 8 illustrates an exemplary flow diagram of a method for determining a permissible media deposition temperature (Td) for use in depositing a magnetic recording layer over a substrate of glass material in accordance with an embodiment of the disclosure.
Figure 9:
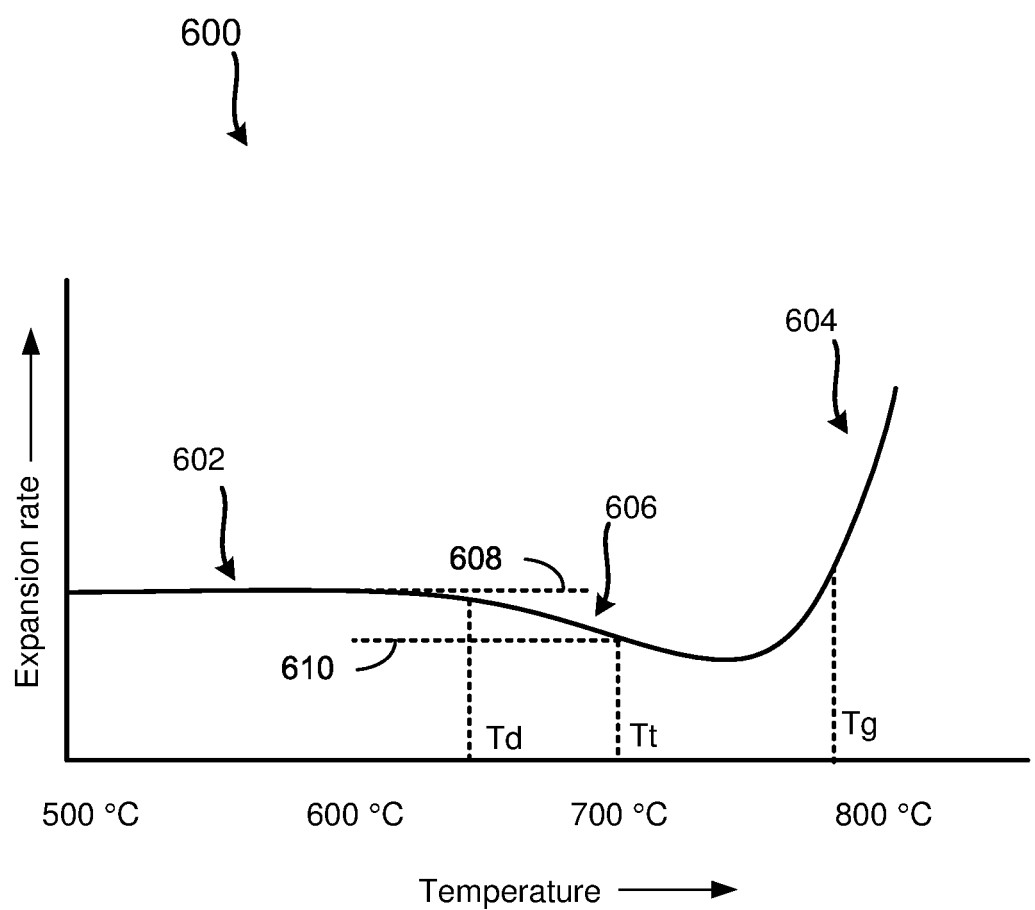
FIG. 9 illustrates a rate of mechanical expansion (slope) versus temperature plot or curve that further illustrates a permissible media deposition temperature (Td) in accordance with an embodiment of the disclosure.
Figure 10:
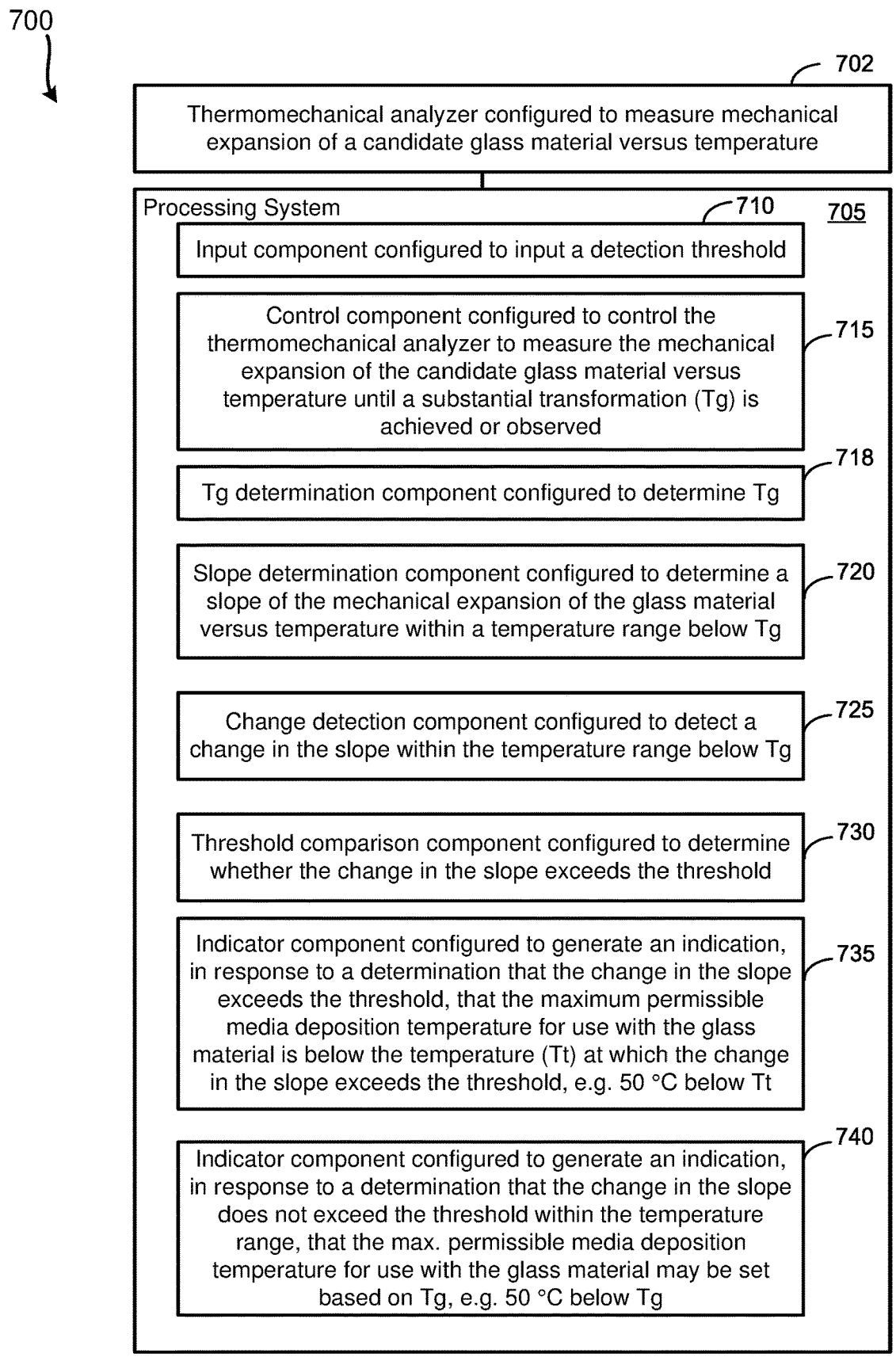
FIG. 10 illustrates an exemplary apparatus configured to determine a permissible media deposition temperature (Td) for use in depositing a magnetic recording layer over a substrate of glass material in accordance with an embodiment of the disclosure.

Turning now to FIGS. 8-10, exemplary methods and apparatus will now be described for setting or determining a permissible media deposition temperature for use in depositing a magnetic recording layer or other layers over a substrate of glass material for use with HAMR or other magnetic recording technologies. Within illustrative examples, the permissible media deposition temperature that is determined is a maximum permissible media deposition temperature. That is, it is the maximum temperature that may be used during deposition without significant risk of deformations that will significantly degrade the flatness of the substrate. However, temperatures below the maximum permissible media deposition temperature may be used and so the descriptions herein more generally refer to a "permissible deposition temperature," which is a temperature at or below the maximum permissible media deposition temperature.

FIG. 8 illustrates a method 500 that may be performed by a computer processor, controller, or other suitable device for or determining a media deposition temperature for use in depositing a magnetic recording layer over a substrate of glass material. At block, 505, the computer processor or other device controls a thermomechanical analyzer (or other suitable measurement device or apparatus) to measure the mechanical expansion of a candidate glass-based material versus temperature until a substantial transformation Tg is achieved or observed (e.g., the primary transformation Tg described above). At block, 510, the computer processor or other device determines the transformation temperature (Tg) for the glass material from the mechanical expansion of the glass material versus temperature. This may be done by determining the intersection of the two slopes as shown in dashed lines in FIG. 1.

At block 515, the computer processor or other device determines the slope of the mechanical expansion of the glass material versus temperature within a temperature range that is below the transformation temperature (Tg) by, for example, computing a first derivative of the slope based on mechanical expansion versus temperature data obtained from the thermomechanical analyzer. In an illustrative example, if Tg is 700° C., the temperature range may be 500° C.-700° C. As noted above, the thermomechanical analyzer should have a feature to control the temperature as function of time.

At block 520, the computer processor or other device detects a change in the slope within the temperature range that is below Tg by, for example, detecting a significant change in the first derivative of the slope. At block 525, the computer processor or other device then determines whether the change in the slope exceeds a threshold, such as a threshold representative of a 20% change in the slope. (Note that the primary transformation (Tg) may have a rate of change threshold associated with it that is greater than the rate of change threshold associated with the lower-temperature smaller transformation (Tt). For example, whereas a slope change of greater than 20% may be used to detect Tt, a larger threshold of, e.g., 50% may be used to detect Tg. That is, the same first derivative-based detection technique used to detect Tt may also be used to detect Tg, but with a higher detection threshold.)

At block 530, if the change in the slope exceeds the threshold within the temperature range, i.e., the material exhibits a significant transformation in the temperature range below Tg, then a maximum permissible or acceptable media deposition temperature for use with the glass material is determined to be below the temperature at which the change in the slope exceeds the threshold. That is, the maximum permissible media deposition temperature for the candidate material should not be set based on Tg but should be selected and set based on the temperature at which the material exhibited the significant transformation below Tg. In one example, the maximum permissible media deposition temperature may be selected or set to a particular value 50° C. below the temperature at which the threshold was exceeded. The computer processor may generate an indication or output a suitable signal to that effect.

On the other hand, at block 535, if the change in the slope does not exceed the threshold within the temperature range being analyzed, i.e., the material does not exhibit any significant transformations at temperatures below Tg in the temperature range analyzed, then the maximum permissible media deposition temperature for use with the glass material may be set based on the transformation temperature (Tg). In one example, the maximum permissible media deposition temperature may be set to 50° C. below Tg.

FIG. 9 illustrates a first derivative curve or plot 600 similar to the plot of FIG. 6 for an exemplary glass-based material for a temperature range extending from 500 to 800° C. in which an initial portion 602 of curve 600 is substantially flat, a final portion 604 increases sharply near Tg, and an intermediate portion 606 exhibits a downward deflection in slope indicative of a first transformation that is well below Tg. The expansion rate (slope) during the substantially constant portion 602 is indicated by dashed line 608. The dashed line 610 represents a rate that is, e.g., 20% below rate 608. (Note that, as with FIG. 6, the expansion rate of FIG. 9 is shown in arbitrary units and so the drawing is not necessarily to scale.) The difference in rate between line 610 and line 608 represents the threshold difference that the computer processor uses at block 525 of FIG. 8 and temperate at which the threshold is exceeded is Tt. In the example of FIG. 9, the maximum acceptable or permissible media deposition temperature Td is set 50° C. below the temperature at which the threshold was exceeded (Tt) so as to be set well below that temperature.

FIG. 10 illustrates a system or apparatus 700 that may be used to implement the method of FIG. 8. The apparatus 700 includes a thermomechanical analyzer 702 configured to measure mechanical expansion of a candidate glass material versus temperature. The apparatus 700 also includes a processor or processing system 705 (e.g., a computer processor) configured to control the thermomechanical analyzer 702 and to analyze data obtained therefrom. The processing system 705 includes an input component 710 configured to input a detection threshold (e.g., 20%). The processing system 705 also includes a control component 715 configured to control the thermomechanical analyzer 702 to measure the mechanical expansion of the candidate glass material versus temperature until a primary transformation is observed. A Tg determination component 718 is configured to determine a value for Tg from the mechanical expansion versus temperature data obtained from the thermomechanical analyzer 702.

A slope determination component 720 is configured to determine a slope of the mechanical expansion of the glass material versus temperature within a temperature range that is below Tg. A change detection component 725 is configured to detect a change in the slope within the temperature range that is below Tg by, for example, detecting a significant change in the first derivative of the slope. A threshold comparison component 730 is configured to determine whether the change in the slope exceeds the threshold. A first indicator component 735 is configured to generate an indication (e.g., a first output signal), in response to a determination that the change in the slope exceeds the threshold, i.e., the material exhibits a significant transformation in the temperature range below Tg, that the maximum permissible media deposition temperature for use with the glass material is below the temperature (Tt) at which the change in the slope exceeds the threshold. That is, the maximum permissible media deposition temperature for the candidate material should not be set based on Tg but should be set based on Tt. In one example, the maximum permissible media deposition temperature may be set to 50° C. below Tt. The computer processor may generate an indication or output a suitable signal to that effect. A second indicator component 740 is configured to generate an indication (e.g., a second output signal), in response to a determination that the change in the slope does not exceed the threshold, i.e., the material does not exhibit any significant transformations at temperatures below Tg in the temperature range analyzed, that the maximum permissible media deposition temperature for use with the glass material may be set based on the transformation temperature (Tg). As noted, the maximum permissible media deposition temperature may be set to 50° C. below Tg. Note that in some examples, a single processor is configured to include each of the processing components shown in FIG. 10 (e.g., components 710, 715, 718, 720, 725, 730, 735, and 740). Note also that a processor or processing system may include both the components of FIG. 10 and the components, described above, of FIG. 7.

Exemplary Magnetic Recording Structures with Glass-Based Material Substrates

Figure 11:
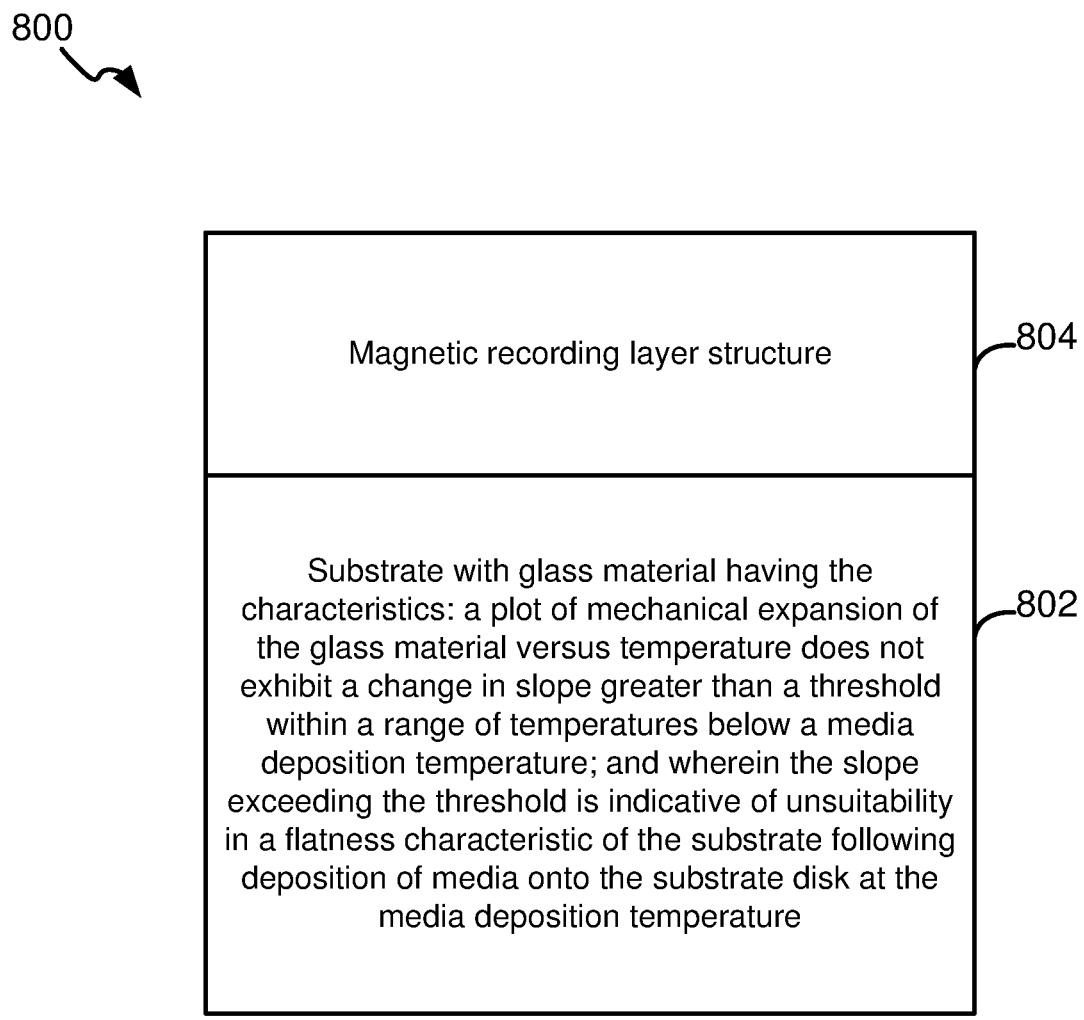
FIG. 11 is side cross sectional view of a magnetic recording structure with a substrate characterized in accordance with an embodiment of the disclosure.
Figure 12:
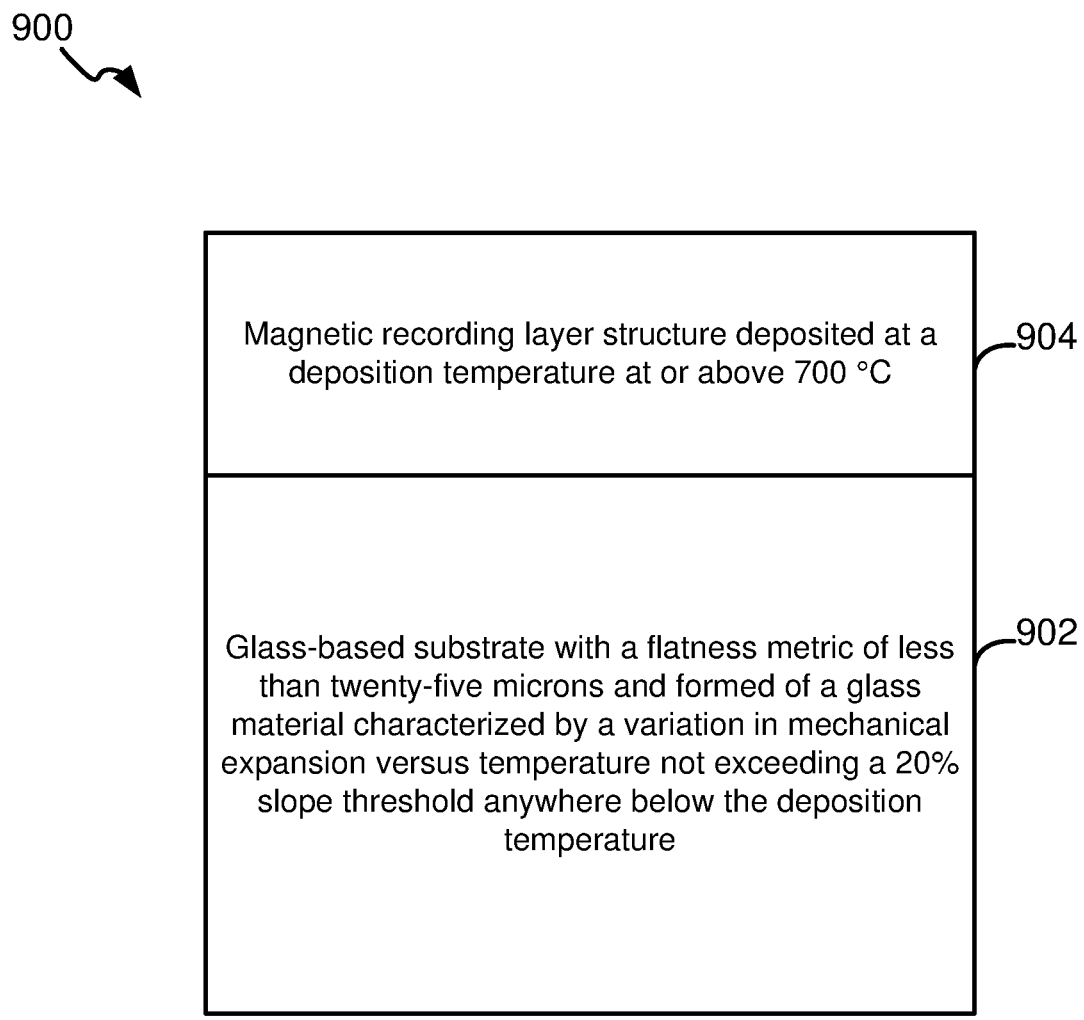
FIG. 12 is side cross sectional view of another magnetic recording structure with a substrate characterized in accordance with an embodiment of the disclosure.
Figure 13:
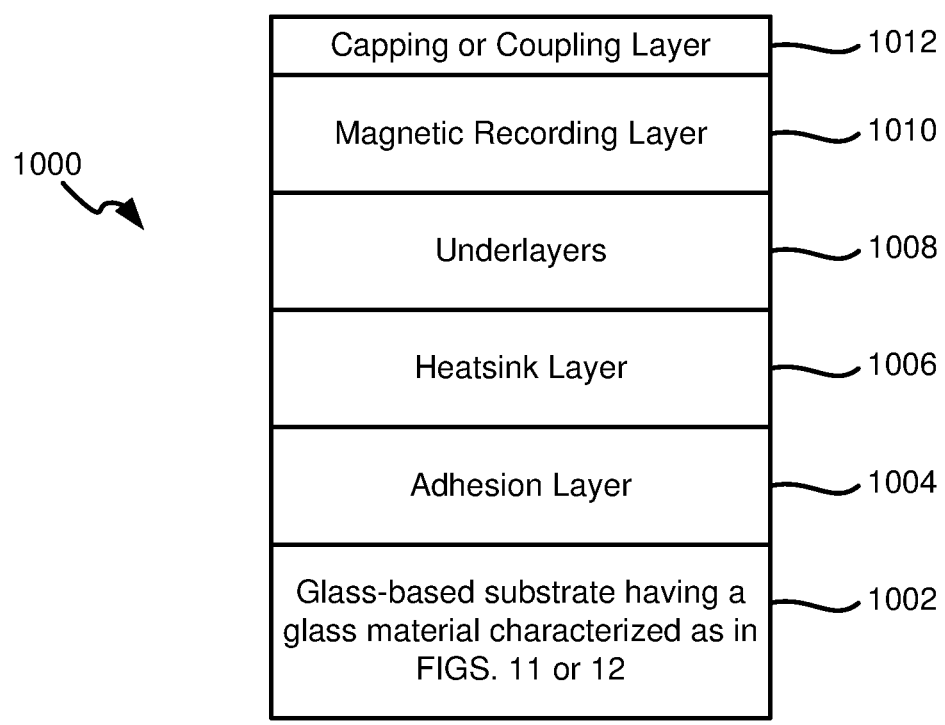
FIG. 13 is side cross sectional view of yet another magnetic recording structure with a substrate characterized in accordance with an embodiment of the disclosure.

Turning now to FIGS. 11-13, exemplary magnetic recording structures with glass-based material substrates will be described for use with a HAMR or other magnetic recording technologies.

FIG. 11 illustrates, in simplified form, an exemplary magnetic recording medium, platform or structure 800 having a glass-based substrate 802 and a magnetic recording layer structure 804 deposited thereon. The glass-based substrate 802 includes a glass material having the characteristics: a plot of mechanical expansion of the glass material versus temperature does not exhibit a change in slope greater than a threshold within a range of temperatures below a media deposition temperature; and wherein the slope exceeding the threshold is indicative of unsuitability in a flatness characteristic of the substrate following deposition of media onto the substrate disk at the media deposition temperature. Note that the magnetic recording layer structure 804 may have various layers and sub-layers that are not separately shown. Moreover, other layers may be provided, such as adhesion layers, heatsink layers, etc., which for clarity and simplicity are not shown in the figure. The magnetic recording layer structure 804 is deposited onto the substrate (or onto intermediate layers between the substrate and the magnetic recording layer structure) at the aforementioned media deposition temperature.

By using a glass material having the aforementioned characteristics, degradations in flatness of the glass-based substrate 802 during high temperature deposition of the magnetic recording layer structure 804 may be avoided so as to avoid corresponding degradation in the magnetic recording platform 800, such as degradation in the aforementioned mechanical properties. The characteristics shown in FIG. 11 are not the only characteristics that may be achieved within the glass-based substrate 802. By way of example, combinations of materials, thickness, disk size, and internal stress (function of deposition temperature) may be employed which satisfy the following equation:

$$\text{Disk flatness} \propto \frac{(\text{Internal stress})(OD^2 - ID^2)}{(\text{Young's Modulus})(\text{Disk thickness}^2)}$$

FIG. 12 illustrates, in simplified form, an exemplary magnetic recording platform, structure or medium 900 having a glass-based substrate 902 with a surface flatness metric of less than twenty-five microns and one or more magnetic recording layers 904 deposited on the glass-based substrate at a deposition temperature at or above 700° C., wherein the glass-based substrate 902 includes a glass material that is characterized by a variation in mechanical expansion versus temperature not exceeding a 20% slope threshold anywhere below the deposition temperature. The glass-based substrate may be either an amorphous glass or a crystalline glass. Note that the magnetic recording layers 904 may have various layers and sub-layers that are not separately shown. Moreover, other layers may be provided, such as adhesion layers, heatsink layers, etc., which for clarity and simplicity are not shown in the figure. In other examples, the surface flatness metric is characterized by some other low value, such as twenty microns, fifteen microns, or ten microns. It should be appreciated that, as a practical matter, there can be some range of flatness values for any particular material based on variations in the purity of samples or other factors. Generally speaking, the higher the deposition temperature, the larger (and therefore poorer) the observed flatness metric.

By using a glass material having the aforementioned characteristics, degradations in flatness of the glass-based substrate 902 during high temperature deposition of the magnetic recording layer structure 904 may be avoided so as to avoid corresponding degradation in the magnetic recording platform 900. The characteristics shown in FIG. 12 are not the only characteristics that may be achieved within the glass-based substrate 902. By way of example, combinations of materials, thickness, disk size, and internal stress (function of deposition temperature) may be employed which satisfy the equation above. Surface flatness metrics are well-known and may represent flatness in terms of deviations in a surface in microns from a perfectly flat surface, with a smaller flatness value representing a better or flatter surface and a larger flatness value representing a poorer or more jagged surface.

For the sake of completeness, FIG. 13 is provided to illustrate additional layers that may be employed with a magnetic recording layer structure for HAMR.

FIG. 13 is side cross sectional view of a magnetic medium 1000 with a glass-based substrate 1002 with a glass material characterized as shown in FIG. 11 or 12, wherein the medium 1000 is configured to couple energy from an NFT. The medium 1000 includes a stacked structure including the aforementioned glass-based substrate 1002 at a base or bottom layer, an adhesion layer 1004 on the glass-based substrate 1002, a heatsink layer 1006 on the adhesion layer 1004, one or more underlayers 1008 on the heatsink layer 1006, the magnetic recording layer 1010 on the underlayers 1008, and a capping or coupling layer 1012 on the magnetic recording layer 1010. In some embodiments, the stacked structure of the medium 1000 further includes a lubricant layer or carbon overcoat on the capping or coupling layer 1012.

In many embodiments, the magnetic recording layer 1010 is made of L10 ordered FePt, L10 ordered CoPt, and/or L10 ordered FePd. In many embodiments, the coupling layer is made of one or more materials such as Ta, Pt, Ru, Ag, Au, Cu, Al, NiTa, C, SiC, SiN, TiC, TiN, and/or other suitable materials. In some embodiments, the coupling layer 1012 is deposited using sputter deposition. In some embodiments, the magnetic recording layer includes FePtXY, CoPtXY and/or FePdXY, where X is selected from the group including Ag, Cu, Ni, BN, B, SiO2, SiN, SiC, and/or C, and where Y is selected from the group including ZrO2, TiO2, MgO, ZrO2, Cr2O3, Ta2O5, NbO5, HfO2, WO3, Y2O3, B2O3, and/or Al2O3. In some embodiments, the medium 1000 further includes a soft magnetic underlayer between the heatsink layer 1006 and the adhesion layer 1004. In one embodiment, the medium 1000 further includes a soft magnetic underlayer between the underlayer and the heatsink layer. In one embodiment, the medium 1000 can include a capping layer positioned between the coupling layer 1012 and the magnetic recording layer 1010.

In several embodiments, the medium 1000 further includes a thin protective layer of low density carbon (e.g., with a thickness of about 7 Angstroms) on or directly on the coupling layer 1012, or another suitable layer acting as a protective overcoat. In several embodiments, the thickness of the coupling layer 1012 is kept to a minimum to maximize head to media spacing. In several embodiments, all layers of the medium 1000 are formed using sputtering. However, in other embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used. In several embodiments, the materials for the adhesion layer 1004, the heatsink layer 1006, and the underlayers 1008 can be those materials that are well known in the art for these layers. In one embodiment, for example, the heat sink layer can be made of one or more materials such as Ag, Al, Au, Cu, Cr, Mo, Ru, W, CuZr, MoCu, AgPd, CrRu, CrV, CrW, CrMo, CrNd, NiAl, NiTa, and/or other suitable materials known in the art. In one embodiment, the underlayers 1008 include a growth layer directly below the recording layer 1010, where the growth layer can be made of one or more materials such as Cr, Mo, NiAl, MgO, TiC, TiN, Ag, CrMo, Pt, Pd, Ru, and/or other suitable materials known in the art.

Further Exemplary Embodiments

Figure 14:
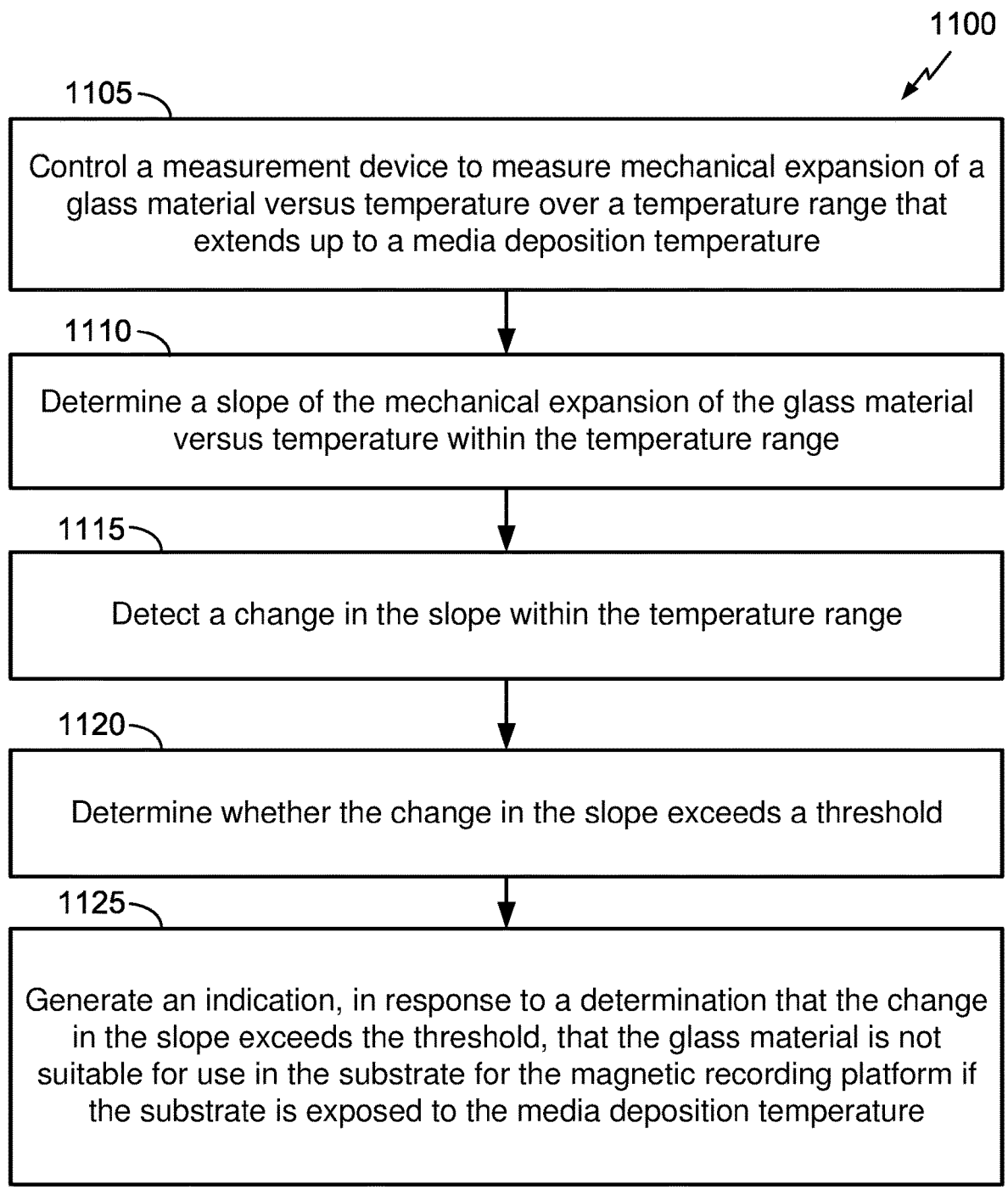
FIG. 14 illustrates an exemplary flow diagram of a method in accordance with an embodiment of the disclosure.

FIG. 14 summarizes a method 1100 that may be performed to characterizing a glass material for suitability in a substrate for a magnetic recording platform. The method may be performed by any suitable apparatus, such as the processing system of FIG. 7. Briefly, at block 1105, the processing system controls a measurement device to measure mechanical expansion of the glass material versus temperature over a temperature range that extends up to a media deposition temperature. At block 1110, the processing system determines a slope of the mechanical expansion of the glass material versus temperature within the temperature range. At block 1115, the processing system detects a change in the slope within the temperature range. At block 1120, the processing system determines whether the change in the slope exceeds a threshold. At block 1125, the processing system generates an indication, in response to a determination that the change in the slope exceeds the threshold, that the glass material is not suitable for use in the substrate for the magnetic recording platform if the substrate is exposed to the media deposition temperature.

Figure 15:
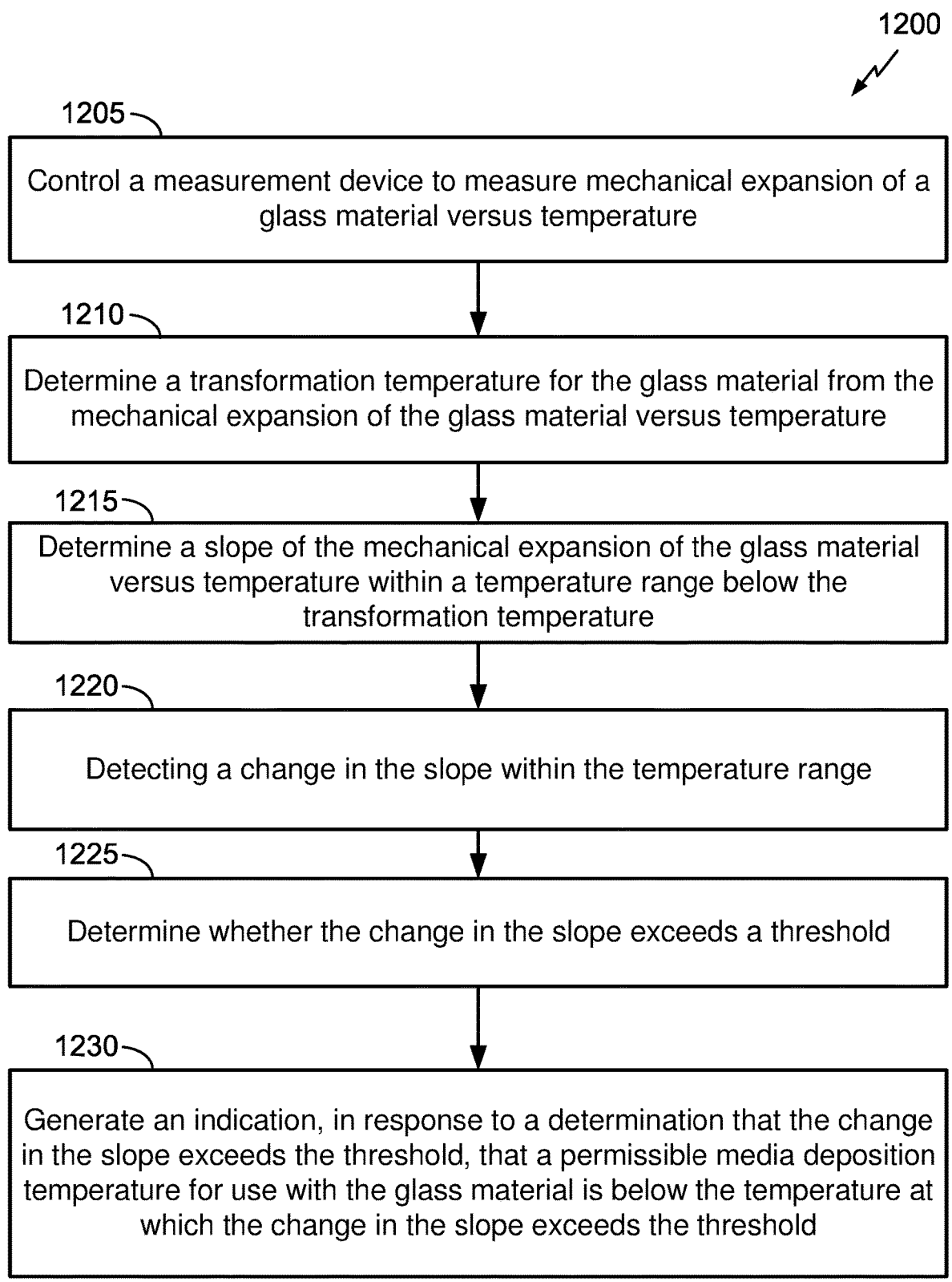
FIG. 15 illustrates an exemplary flow diagram of another method in accordance with an embodiment of the disclosure.

FIG. 15 summarizes a method 1200 that may be performed to determine a permissible media deposition temperature for use in depositing a magnetic recording layer or other layer over a substrate of glass material. The method may be performed by any suitable apparatus, such as the processing system of FIG. 10. Briefly, at block 1205, the processing system controls a measurement device to measure mechanical expansion of the glass material versus temperature. At block 1210, the processing system determines a transformation temperature for the glass material from the mechanical expansion of the glass material versus temperature. At block 1215, the processing system determines a slope of the mechanical expansion of the glass material versus temperature within a temperature range below the transformation temperature. At block 1220, the processing system detects a change in the slope within the temperature range. At block 1225, the processing system determines whether the change in the slope exceeds a threshold. At block 1230, the processing system generates an indication, in response to a determination that the change in the slope exceeds the threshold, that a permissible media deposition temperature for use with the glass material is below the temperature at which the change in the slope exceeds the threshold.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

What is claimed is:

1. A method for determining a permissible media deposition temperature for use in depositing a layer over a substrate of glass material, the method comprising:
controlling a measurement device to measure mechanical expansion of the glass material versus temperature;
determining a transformation temperature for the glass material from the mechanical expansion of the glass material versus temperature;
determining a slope of the mechanical expansion of the glass material versus temperature within a temperature range below the transformation temperature;
detecting a change in the slope within the temperature range;
determining whether the change in the slope exceeds a threshold; and
generating an indication, in response to a determination that the change in the slope exceeds the threshold, that a permissible media deposition temperature for use with the glass material is below the temperature at which the change in the slope exceeds the threshold.

2. The method of claim 1, wherein the transformation temperature is at least 700° C. and the permissible media deposition temperature is below 700° C.

3. The method of claim 1, wherein the permissible media deposition temperature is a maximum permissible media deposition temperature at least 50° C. below the transformation temperature.

4. The method of claim 1, wherein the temperature range is 20° C. to 700° C.

5. The method of claim 1, wherein the temperature range is 500° C. to 700° C.

6. The method of claim 1, wherein the temperature range extends from 200° C. below the transformation temperature up to the transformation temperature.

7. The method of claim 1, wherein controlling the measurement device comprises controlling a thermomechanical analyzer.

8. The method of claim 1, wherein determining the slope comprises determining a first derivative of a plot of the mechanical expansion of the glass material versus temperature.

9. The method of claim 8, wherein the threshold corresponds to a 20% change in the slope.

10. The method of claim 1, further comprising selecting, in response to the determination that the change in the slope exceeds the threshold, a particular value for a maximum permissible media deposition temperature for use with the glass material that is below the temperature at which the change in the slope exceeds the threshold.

11. The method of claim 1, further comprising generating an indication, in response to a determination that the change in the slope does not exceed the threshold within the temperature range, that a maximum permissible media deposition temperature for use with the glass material should be set based on the transformation temperature.

12. A method for characterizing a glass material for suitability in a substrate for a magnetic recording platform, the method comprising:
controlling a measurement device to measure mechanical expansion of the glass material versus temperature over a temperature range that extends up to a media deposition temperature;
determining a slope of the mechanical expansion of the glass material versus temperature within the temperature range;
detecting a change in the slope within the temperature range;
determining whether the change in the slope exceeds a threshold; and
generating an indication, in response to a determination that the change in the slope exceeds the threshold, that the glass material is not suitable for use in the substrate for the magnetic recording platform if the substrate is exposed to the media deposition temperature.

13. The method of claim 12, wherein the media deposition temperature is at least 700° C.

14. The method of claim 13, wherein the temperature range is 20° C. to 700° C.

15. The method of claim 13, wherein the temperature range is 500° C. to 700° C.

16. The method of claim 12, wherein the temperature range extends from 200° C. below the media deposition temperature up to the media deposition temperature.

17. The method of claim 12, wherein controlling the measurement device comprises controlling a thermomechanical analyzer.

18. The method of claim 12, wherein determining the slope comprises determining a first derivative of a plot of the mechanical expansion of the glass material versus temperature.

19. The method of claim 18, wherein the threshold corresponds to a 20% change in the slope.

20. The method of claim 12, further comprising generating an indication, in response to the determination that the change in the slope exceeds the threshold, that a flatness metric of the substrate will exceed a flatness metric threshold if the substrate is exposed to the media deposition temperature.

21. The method of claim 12, further comprising generating an indication, in response to the determination that the change in the slope exceeds the threshold, that the glass material is not suitable for use with heat assisted magnetic recording (HAMR).

22. The method of claim 12, further comprising generating an indication, in response to a determination that the change in the slope does not exceed the threshold within the temperature range, that the glass material is suitable for use in the substrate for the magnetic recording platform even if exposed to the media deposition temperature.

23. The method of claim 12, further comprising generating an indication, in response to a determination that the change in the slope does not exceed the threshold within the temperature range, that the glass material is suitable for use with heat assisted magnetic recording (HAMR).

\* \* \* \* \*